United States Patent Office 2,909,507
Patented Oct. 20, 1959

2,909,507

POLYVINYL ACETALS

Richard H. Cahill, Morris Plains, Charles A. De Fazio, Summit, and John C. Lukman, Morris Plains, N.J., assignors to Celanese Corporation of America, New York, N.Y., a corporation of Delaware No Drawing. Application August 31, 1955
Serial No. 531,841

8 Claims. (Cl. 260—73)

This invention relates to the production of acetals and relates more particularly to the preparation of polyvinyl acetals, such as polyvinyl butyral, from polyvinyl esters.

Polyvinyl butyral is most commonly employed in the art as an interlayer in safety glass and as a wash-primer for metal. It is generally prepared from polyvinyl acetate by a process which involves the hydrolysis of the polyvinyl acetate to produce polyvinyl alcohol and subsequent reaction of the polyvinyl alcohol with butyraldehyde. In some cases the hydrolysis and butyralization reactions may be caried out simultaneously. The processes employed in the prior art have been relatively slow and the polyvinyl butyrals produced thereby have generally been contaminated with undesirably large amounts of impurities so that it has been necessary to subject the products to very extensive washing and stabilizing treatments.

It is therefore an important object of this invention to provide a novel process for the production of polyvinyl butyral which will be free from the foregoing and other disadvantages.

Another object of this invention is the provision of a new and rapid process for the preparation of polyvinyl acetals of a high degree of purity.

Other objects of this invention will be apparent from the following detailed description and claims. In this description and claims all proportions are by weight unless otherwise indicated.

In accordance with one aspect of this invention, polyvinyl butyral is produced by a process which involves de-esterifying polyvinyl acetate in solution in methanol containing sodium hydroxide to produce a slurry or suspension of polyvinyl alcohol in a liquid comprising methanol and methyl acetate, the latter obtained from the reaction of the methanol and polyvinyl acetate. Thereafter sulfuric acid and butyraldehyde are added, the former in an amount sufficient to neutralize the sodium hydroxide and to provide a slight excess of acid. The free sulfuric acid acts as a catalyst to cause the butyraldehyde to react exothermically with the polyvinyl alcohol to form polyvinyl butyral, which dissolves in the reaction medium and may thereafter be recovered from the reaction medium by precipitation with a non-solvent.

According to one feature of this invention the amount of methanol employed is kept at a minimum. This makes the process more economical since it reduces the amount of methanol which is lost in the process and makes possible the use of smaller reaction vessels and a smaller solvent-recovery system. In addition, the reaction proceeds more rapidly when the amount of methanol is reduced and the concentration of the polyvinyl compound therein is increased. However, the decrease in the proportion of methanol causes an increase in the tendency of the reaction mixture to form a thick unworkable gel during the de-esterification. It is difficult to break up this gel into the desired small particles even when violent agitation is used. In accordance with one aspect of this invention, this difficulty is overcome by adding gradually a solution of the polyvinyl acetate in methanol to a body of methanol containing the sodium hydroxide while agitating the mixture. The polyvinyl acetate solution should be added at such a rate that the resulting polyvinyl alcohol precipitates out in particle form or in a form which is easily broken up by agitation so that a slurry or suspension of the polyvinyl alcohol is produced.

The choice of the optimum concentration of the methanol solution of polyvinyl acetate being de-esterified will depend to some extent on the molecular weight, or intrinsic viscosity, of the polyvinyl acetate which is used. Thus, the higher the molecular weight of the polyvinyl acetate, the more methanol will be required for optimum results. For example, when the polyvinyl acetate is of the relatively low molecular weight type designated as "viscosity grade #7," very good results are obtained when the amount of methanol present during the de-esterificatation reaction is about equal to the amount of polyvinyl acetate. In contrast, when the same reaction and agitation conditions are employed but the much higher molecular weight type of polyvinyl acetate designated as "viscosity grade #800" is substituted for the "viscosity grade #7" material, the total amount of methanol present during the de-esterification reaction should be about 4 to 5 times the amount of polyvinyl acetate in order that the desired slurry or suspension may be formed. Very good results have been obtained when the viscosity of the methanol solution of polyvinyl acetate has been in the range of about 1800 to 3000 centipoises and the amount of methanol in the methanol-sodium hydroxide solution, to which said polyvinyl acetate solution is added gradually, has been about 5 to 21% of the total amount of said polyvinyl acetate solution added thereto.

The "viscosity grade" numbers, referred to above, designate the viscosity in centipoises of a 1 molar benzene solution (containing 86 grams of the polyvinyl acetate in one liter of solution) at 20° C.

All of the sodium hydroxide used in the de-esterification reaction may be present at the start. Alternatively, only part may be present initially, the remainder being added gradually, preferably in the form of a solution in methanol, to the reaction mixture during the addition of the polyvinyl acetate solution. The amount of sodium hydroxide is desirably about 0.6 to 1.5% based on the weight of polyvinyl acetate, optimum results being obtained when about 0.8 to 1.2% is used.

For best results the methanol solution being employed should be essentially anhydrous, and preferably should contain less than about 0.15% of water. Also, the polyvinyl acetate should contain little, if any, monomeric vinyl acetate, preferably less than about 0.15% of the monomer, based on the polyvinyl acetate.

Although the de-esterification reaction may be carried out at temperatures close to room temperature, it is preferred to speed up the reaction by working at the reflux temperature of the mixture. At atmospheric pressure this reflux temperature is about 64° C. but it may be increased, e.g. to 98° C., by operating under superatmospheric pressures, such as pressures of 37 to 50 p.s.i.g. When such elevated temperatures are employed and the polyvinyl alcohol produced is separated from the reaction medium, the recovered product is found to have a yellowish color. Much lighter polyvinyl alcohols are obtained when lower reaction temperatures, e.g. 30° C., are employed. Surprisingly, when the process of the present invention is followed, that is, when the polyvinyl alcohol is not separated but is reacted further in the same medium with butyraldehyde in the presence of sulfuric acid, it is found that the resulting polyvinyl butyral is a substantially white product exhibiting no traces of yellowing even when the aforesaid reflux temperatures are employed.

The de-esterification of the polyvinyl acetate is preferably continued until it is substantially complete, that is, until at least 98% of the acetate groups have been converted to hydroxyl groups. To this end, the reaction mixture should be maintained at the reaction temperature for some time, e.g. 15 minutes, after the last portion of polyvinyl acetate solution has been added thereto.

After the de-esterification reaction has proceeded to the desired extent the reaction mixture is acidified with sulfuric acid and the butyraldehyde is added. Since the butyralization reaction is highly exothermic, it is preferable to cool the reaction mixture slightly, e.g. by about 15° C., as from 64° C. down to 50° C., before both butyraldehyde and sulfuric acid are added. It is generally advisable to add the sulfuric acid in the form of a solution thereof, preferably in methanol, to insure uniform distribution of the acid and to avoid local overheating or dehydration of the polymer. It is also advisable to add the sulfuric acid first and thereafter to add all of the butyraldehyde at a rapid rate, rather than gradually, to the acidified mixture in order to obtain a more homogeneous product.

The butyralization reaction is advantageously carried out at the reflux temperature of the reaction mixture. At atmospheric pressure this reflux temperature is about 64° C. An increase in the reflux temperature and a resulting increase in the rate of reaction may be attained by operating at superatmospheric pressure, preferably a pressure of at least about 1.5 atmospheres (absolute), e.g. about 10 to 40 p.s.i.g. corresponding to temperatures of about 75 to 100° C. If desired, however, the butyralization reaction may be carried out at lower temperatures, e.g. below the reflux temperature at atmospheric pressure, for instance at 58° C.

The proportion of sulfuric acid may be varied depending on the speed of reaction desired. It is generally preferable to use small amounts of this catalyst. Thus, the amount of excess sulfuric acid, i.e. the amount over and above that which is stoichiometrically equivalent to the amount of sodium hydroxide employed in the de-esterification step, is advantageously about 1.5 to 12.5%, based on the original polyvinyl acetate content.

The amount of butyraldehyde used in the process of this invention may be varied. For example, polyvinyl butyral of high butyral content has been produced in accordance with this invention using 0.4 to 0.6 molecule of butyraldehyde per alcoholic hydroxyl group of the polyvinyl alcohol. From an economic viewpoint it is desirable to use as little excess butyraldehyde as possible, although the excess and unreacted butyraldehyde may be recovered from the reaction mixture.

Preferably the butyralization reaction is continued until the product has a butyral content of at least about 76%, calculated as polyvinyl butyral (showing that at least about ⅔ of the hydroxyl groups of the polyvinyl alcohol have combined with butyraldehyde), and all of the polyvinyl resin is in solution in the reaction medium. Thereafter the sulfuric acid catalyst is neutralized, preferably by adding to the reaction mixture an alkaline material, such as sodium hydroxide, and the polyvinyl butyral is precipitated by mixing the neutralized solution with water. It is found that the degree of purity of the polyvinyl butyral is higher when the sulfuric acid is neutralized before, rather than after, the precipitation step. It is convenient to carry out the precipitation continuously by adding a stream of the reaction mixture and a stream of water to a precipitation zone and continuously removing precipitated polyvinyl butyral and water containing dissolved methanol and methyl acetate. Alternatively the polyvinyl butyral may be precipitated batchwise by adding water to the reaction mixture while agitating vigorously. The precipitated polyvinyl butyral may be further purified by washing it in a large excess of water.

By the use of the process of this invention, polyvinyl butyral of high purity may be produced from polyvinyl acetate in a very economical manner and using a comparatively short period of about two hours or less.

While the invention finds its greatest utility in the preparation of polyvinyl butyral from polyvinyl acetate, it may also be employed for the preparation of other polyvinyl acetals by the substitution of other aldehydes, such as propionaldehyde, valeraldehyde or isobutyraldehyde or mixtures thereof, for part or all of the butyraldehyde. Furthermore, other polyvinyl esters, e.g. polyvinyl propionate, polyvinyl butyrate or copolymers thereof with polyvinyl acetate, may be employed as the starting material. In addition, other alkali metal hydroxides, such as potassium hydroxide, may be used in place of the sodium hydroxide.

The following examples are given to illustrate this invention further.

*Example I*

A solution of 3.6 parts of sodium hydroxide in 125 parts of methanol is refluxed at atmospheric pressure in a reactor. A polyvinyl acetate solution prepared by dissolving 300 parts of polyvinyl acetate (viscosity grade #7) in 300 parts of methanol is maintained at a temperature of 60° C. The hot polyvinyl acetate solution is added gradually at a uniform rate over a period of 15 minutes to the reactor while maintaining the mixture in the reactor at reflux temperature and under vigorous agitation. Within a minute or two after the addition of the polyvinyl acetate solution is started, polyvinyl alcohol particles begin to precipitate out in the reactor. After all the polyvinyl acetate solution has been added, the reaction is continued at reflux temperature for another 15 minutes and the mixture is then cooled to a temperature of 55° C. at which point the polyvinyl acetate is at least 98% hydrolyzed to polyvinyl alcohol. Then a solution of 37 parts of 96% sulfuric acid in 100 parts of methanol is added to the reaction mixture and immediately thereafter 152 parts of butyraldehyde of 96% purity are added. The resulting reaction mixture is maintained at reflux for one hour under agitation. The mixture is then cooled to 30° C. and neutralized, during the cooling process, with a sufficient amount of a saturated solution of sodium hydroxide in methanol to raise its pH to 8.0. A stream of the cooled neutralized solution is passed continuously into contact with a stream of cold tap water. The resulting precipitated polyvinyl butyral is slurried with a large excess of tap water for one half hour and then drained; this procedure is repeated twice, after which the polyvinyl butyral is dried. The dried polyvinyl butyral is a white powder, having a hydroxyl content, calculated as polyvinyl alcohol, of 18.2%, an acetate content, calculated as polyvinyl acetate, of 1.0%, and a butyral content, calculated as polyvinyl butyral, of 80.8%. The ash content of the product is not over 0.1%. It may be subjected to a temperature of 60° C. for 150 hours without change in color. On heating this polyvinyl butyral for 2 hours at a temperature of 160° C. the product is fused and no darker than orange-yellow in color.

*Example II*

Example I is repeated except that the polyvinyl acetate solution contains 240 parts of polyvinyl acetate (viscosity grade #15) and 360 parts of methanol, and there are used 2.88 parts of sodium hydroxide in the first stage and 30 parts of 96% sulfuric acid and 122 parts of 96% butyraldehyde in the second stage. The results are similar to those of Example I, except that a polyvinyl butyral of higher molecular weight is obtained.

*Example III*

Example I is repeated except that the polyvinyl acetate solution contains 200 parts of polyvinyl acetate (viscosity grade #25) and 400 parts of methanol, and there are used 2.4 parts of sodium hydroxide in the first stage and 24.7 parts of 96% sulfuric acid and 101 parts of 96% butyraldehyde in the second stage. The results are similar to those of Example I, except that a polyvinyl butyral of higher molecular weight is obtained.

*Example IV*

Example I is repeated except that the amount of sulfuric acid is reduced to 15 parts and the amount of 96% butyraldehyde to 108 parts. Also, immediately after the butyraldehyde is added the reaction mixture is placed under pressure and heated so that a temperature of 98° C. and a pressure of 37 p.s.i.g. are attained 10 minutes after the addition of butyraldehyde. The reaction mixture is maintained under this pressure and temperature for a further period of ten minutes and then rapidly restored to atmospheric pressure and cooled to 55° C. Further neutralization and cooling, as well as precipitation and washing, are carried out as in Example I. The product has a hydroxyl content of 19.0%, an acetate content of 1.0% and a butyral content of 80.0%, all these proportions being calculated as in Example I. It contains 0.1% of ash and may be heated to a temperature of 60° C. for 150 hours without change in color. Heating of the product for 2 hours at 160° C. causes it to turn light yellow.

*Example V*

Example IV is repeated except that the polyvinyl acetate solution contains 150 parts of polyvinyl acetate (viscosity grade #60) and 450 parts of methanol and there are used 1.80 parts of sodium hydroxide in the first stage and 2.25 parts of 96% sulfuric acid and 90 parts of 96% butyraldehyde in the second stage, the total time for the reaction of the butyraldehyde in said second stage being 15 minutes. The product has a hydroxyl content of 19.3%, an acetate content of 0.4% and a butyral content of 80.3%, all calculated as in Example I. Its ash content is 0.03%. Heating of the product at a temperature of 60° C. for 150 hours causes no change in color, while heating at 160° C. for two hours causes it to become only slightly off-white.

It is to be understood that the foregoing detailed description is merely given by way of illustration and that many variations may be made therein without departing from the spirit of our invention.

Having described our invention, what we desire to secure by Letters Patent is:

1. Process for the production of polyvinyl butyral, which comprises de-esterifying polyvinyl acetate in solution in essentially anhydrous methanol containing sodium hydroxide until at least 98% of the acetate groups have been converted to hydroxyl groups to produce a suspension of particles of polyvinyl alcohol in a liquid comprising methanol and methyl acetate, adding to said suspension sulfuric acid in methanol and then butyraldehyde in an amount sufficient to provide 0.4 to 0.6 molecule of butyraldehyde per alcoholic hydroxyl group of the polyvinyl alcohol, the amount of sulfuric acid being sufficient to acidify said suspension, and reacting said butyraldehyde and said polyvinyl alcohol at a temperature of at least 64° C. to produce a solution of polyvinyl butyral having a butyral content of at least about 76% calculated as polyvinyl butyral, the total period for said de-esterification step and said reaction with butyraldehyde taking not more than about two hours.

2. Process as set forth in claim 1 in which during said de-esterification a solution of polyvinyl acetate in methanol is added gradually to a solution of sodium hydroxide in methanol at the reflux temperature of the resulting mixture.

3. Process as set forth in claim 1 in which said solution of polyvinyl butyral is neutralized with an alkaline material and thereafter diluted with water to precipitate the polyvinyl butyral therefrom.

4. Process as set forth in claim 1 in which during said de-esterification a solution of polyvinyl acetate in methanol is added gradually to a solution of sodium hydroxide in methanol at the reflux temperature of the resulting mixture and in which said solution of polyvinyl butyral is neutralized with an alkaline material and thereafter diluted with water to precipitate the polyvinyl butyral therefrom.

5. Process for the production of polyvinyl butyral, which comprises gradually adding a solution of polyvinyl acetate in methanol to a solution of sodium hydroxide in methanol, while refluxing the resulting mixture at an elevated temperature and while agitating, until at least 98% of the acetate groups have been converted to hydroxyl groups to produce a suspension of particles of polyvinyl alcohol in a mixture of methanol and methyl acetate, adding an excess of a solution of sulfuric acid in methanol to said suspension and then adding butyraldehyde in an amount sufficient to provide 0.4 to 0.6 molecule of butyraldehyde per alcoholic hydroxyl group of the polyvinyl alcohol and refluxing the resulting acidic mixture at an elevated temperature of at least 64° C. to produce a solution of polyvinyl butyral having a butyral content of at least about 76% calculated as a polyvinyl butyral, neutralizing the latter solution with sodium hydroxide, diluting the neutralized solution with water to precipitate the polyvinyl butyral, and washing the precipitated polyvinyl butyral with water, the total period for said de-esterification step and said reaction with butyraldehyde taking not more than about two hours.

6. Process as set forth in claim 5 in which the refluxing of the mixture of polyvinyl acetate and methanol is carried out at a pressure ranging from atmospheric pressure to a pressure of 50 p.s.i.g., and in which the methanol is substantially anhydrous.

7. Process as set forth in claim 1 in which the reaction of butyraldehyde and polyvinyl alcohol is effected under a pressure of about 10 to 40 p.s.i.g. and at a temperature of about 75 to 100° C.

8. Process as set forth in claim 1 in which the viscosity of said solution of polyvinyl acetate in methyl alcohol is in the range of about 1800 to 3000 centipoises and the amount of methyl alcohol in said solution of alkali metal hydroxide is about 5 to 21% of the total amount of said solution of polyvinyl acetate in methanol.

References Cited in the file of this patent

UNITED STATES PATENTS

| | | |
|---|---|---|
| 2,109,883 | Herrmann et al. | Mar. 1, 1938 |
| 2,194,613 | Perkins | Mar. 26, 1940 |
| 2,457,261 | Morrison et al. | Dec. 28, 1948 |
| 2,478,431 | Stamatoff | Aug. 9, 1949 |

FOREIGN PATENTS

| | | |
|---|---|---|
| 637,737 | Great Britain | May 24, 1950 |
| 891,745 | Germany | Oct. 1, 1953 |
| 899,864 | Germany | Dec. 17, 1953 |